(12) United States Patent
Lotz

(10) Patent No.: US 11,065,821 B2
(45) Date of Patent: Jul. 20, 2021

(54) VIBRATION WELDING DEVICE, METHOD FOR CONNECTING AT LEAST TWO ELONGATED COMPONENTS BY VIBRATION WELDING, AND A PRODUCTION METHOD FOR THE VIBRATION WELDING DEVICE

(71) Applicant: BRANSON Ultraschall Niederlassung der Emerson Technologies GmbH & Co. OHG, Dietzenbach (DE)

(72) Inventor: Wilfried Lotz, Neuberg (DE)

(73) Assignee: BRANSON Ultraschall Niederlassung der Emerson Technologies GmbH & Co. OHG, Dietzenbach (DE)

( * ) Notice: Subject to any disclaimer, the term of this patent is extended or adjusted under 35 U.S.C. 154(b) by 205 days.

(21) Appl. No.: 16/384,344

(22) Filed: Apr. 15, 2019

(65) Prior Publication Data

US 2019/0315068 A1    Oct. 17, 2019

(30) Foreign Application Priority Data

Apr. 16, 2018    (DE) .......................... 102018108979.1

(51) Int. Cl.
*B29C 65/06* (2006.01)
*B29C 65/00* (2006.01)

(52) U.S. Cl.
CPC ............ *B29C 65/06* (2013.01); *B29C 66/951* (2013.01)

(58) Field of Classification Search
CPC ... B29C 65/06; B29C 65/0681; B29C 65/069; B29C 65/081; B29C 66/951; B29C 66/9511; B29C 66/9512; B29C 66/9513; B29C 66/9515; B29C 66/9516; B29C 66/9517

See application file for complete search history.

(56) References Cited

U.S. PATENT DOCUMENTS

| 5,421,925 A | 6/1995 | Kulaszewicz et al. |
| 5,614,057 A | 3/1997 | Conley, Jr. et al. |
| 5,828,156 A * | 10/1998 | Roberts ..................... B06B 3/00 |
| | | 310/317 |
| 6,604,668 B2 | 8/2003 | Crasser |

(Continued)

FOREIGN PATENT DOCUMENTS

| CN | 1370109 A | 9/2002 |
| CN | 1943955 A | 4/2007 |

(Continued)

OTHER PUBLICATIONS

EP Search Report for EP Application No. 19165435.9 dated Sep. 2, 2019 (11 pages).

(Continued)

*Primary Examiner* — George R Koch
(74) *Attorney, Agent, or Firm* — Reising Ethington P.C.

(57) ABSTRACT

A vibration welding device having a mechanically coupled multiple vibrator. Within this vibration welding device, the plurality of vibration units are arranged relative to an elongated tool such that the first direction of vibrations of the individual vibration units is oriented approximately transverse to a longitudinal axis of the tool such that, during a vibration welding process, two components are weldable to each other by vibrations different than a longitudinal direction of the components.

21 Claims, 7 Drawing Sheets

(56) References Cited

U.S. PATENT DOCUMENTS

| | | | |
|---|---|---|---|
| 7,964,046 B2 | 6/2011 | Neuroth et al. | |
| 9,950,823 B2 | 4/2018 | Solenthaler | |
| 2003/0164218 A1* | 9/2003 | Brahm | B60R 21/04 |
| | | | 156/73.5 |
| 2007/0029366 A1* | 2/2007 | Neuroth | B29C 65/06 |
| | | | 228/101 |
| 2008/0265004 A1 | 10/2008 | Stroh | |
| 2014/0033653 A1 | 2/2014 | Cham et al. | |
| 2014/0070563 A1 | 3/2014 | Kurata | |
| 2014/0338814 A1* | 11/2014 | Klinstein | B29C 66/0242 |
| | | | 156/64 |

FOREIGN PATENT DOCUMENTS

| | | | |
|---|---|---|---|
| CN | 105163926 A | 12/2015 | |
| CN | 206811305 U | 12/2017 | |
| EP | 1772253 B1 | 8/2011 | |
| JP | S6178626 A | 4/1986 | |
| JP | H04223136 A | 8/1992 | |
| JP | H05116220 A | 5/1993 | |
| JP | 2001096623 A | 4/2001 | |
| JP | 2003507210 A | 2/2003 | |
| JP | 2006062164 A | 3/2006 | |
| JP | 2007144996 A | 6/2007 | |
| JP | 2008238111 A | 10/2008 | |
| JP | 2017113194 A | 6/2017 | |
| KR | 1020070038436 A | 4/2007 | |
| TW | 201006661 A | 2/2010 | |

OTHER PUBLICATIONS

JP Office Action for JP Application No. 2019-077547 dated Mar. 24, 2020 (3 pages).

KR Notice of Allowance for KR Application No. 10-2019-0044141 dated Jun. 22, 2020 (2 pages).

CN Office Action for CN Application No. 201910300561.6 dated Dec. 3, 2020 (7 pages).

* cited by examiner

VIBRATION WELDING DEVICE, METHOD FOR CONNECTING AT LEAST TWO ELONGATED COMPONENTS BY VIBRATION WELDING, AND A PRODUCTION METHOD FOR THE VIBRATION WELDING DEVICE

CROSS REFERENCE TO RELATED APPLICATIONS

This application claims the priority of German patent application No. DE102018108979.1, filed on Apr. 16, 2018. The entire content of this priority application is incorporated herein by reference in its entirety.

TECHNICAL FIELD

The present disclosure relates to a vibration welding device having a mechanically coupled multiple vibrator. Moreover, the present disclosure relates to the use of a vibration welding device for welding at least two elongated components, a method for connecting at least two elongated components with the assistance of said vibration welding device, as well as a production method for the vibration welding device in which a plurality of electromechanical vibrators are mechanically coupled.

BACKGROUND

In plastic bonding, vibration welding is a known method. Two plastic parts are connected by means of friction and heat generated thereby. In general, one plastic part is securely held, and the other is moved under pressure linearly, or respectively orbitally against the other plastic part.

In linear vibration welding, the relative movement of the plastic parts against each other is along the longer side of the geometry of the oscillating component. In order to prevent the movement from slanting, the components are held by a tool in the machine such that an extremely flat welding surface arises in the direction of movement.

With elongated parts, the construction of the weld seam design is chosen such that the welding direction is in the direction of the longest side of the component.

If the component has significant slopes in the longitudinal direction, or for example there is a rectangular, i.e., L-shaped, change in contour, vibration in the longitudinal direction is impossible. This is for example the case in the automotive industry with bumpers, rear lights that extend around the corner, and dashboards as well.

Currently, the trend is toward rear lights that reach around the corner. These are components that, at a depth in the X-direction of typically less than 20 cm, reach a length in the Y-direction of nearly 2 m or more and are U-shaped.

Currently, these applications are welded as follows:

According to a first alternative, a standard welding machine is used with a vibration direction in the Y-direction in order to weld an elongated component with a longitudinal extension in the Y direction. The component is rotated 90° so that the shorter X-axis of the component is then oriented in the Y vibration direction of the welding machine. Rotating the vibration head by 90° and retaining the alignment of the component would also be equivalent to this. In this case, the component extends far out to the side, and the associated mass distribution associated therewith leads to an asymmetrical vibration (or wobbling) of the component. The weld seam/joint is correspondingly flawed. The ergonomics for loading and unloading the machine are also problematic and error-prone.

In a second alternative, two vibration heads are used in the same orientation as in the first alternative. This arrangement has the disadvantage that the two vibration heads only vibrate in-phase with very extensive regulation. Another disadvantage results from the differences in the vibration amplitudes of the employed vibration heads. Different amplitudes result in uneven welding results. This situation also requires a certain flexibility of the component to be welded or the component holder (upper tool) which also negatively affects the welding results.

Moreover, two adjacently-arranged vibration heads constitute a structural width for the elongated component that is too small so that plastic parts which possess a greater length in the Y direction are not optimally adapted to the vibrators. The components extend problematically in the Y direction beyond the vibration heads and negatively influence the vibration behavior (tendency to wobble). On the other hand, two vibration heads that lie far part from each other in the Y direction are difficult to regulate, which negatively affects the desired vibration behavior in the X direction.

In a third alternative, a plurality of vibration heads are electronically coupled. This arrangement is described in EP 1 772 253 B1, "Device and method for vibration welding". In this case, N vibration heads (N=2 or more) are arranged adjacent to each other and are electronically coupled, wherein one vibration head serves as a master, and the others as a slave. The slaves are regulated to the amplitude and phase of the master so that all vibrating units vibrate in phase and in amplitude.

The advantage of this method is that each vibration head is considered an individual unit, and the maximum number of vibration heads is only limited by the speed of the regulation. With this arrangement of individual vibration heads, each vibration head arrangement has a separate tool. The disadvantage is that all tools must have a nearly identical weight and geometry in order to achieve equivalent frequencies of the vibration heads. The vibration heads are in particular always operated at or close to the resonance frequency that depends on weight. This frequency must be the same or at least close enough for all vibration heads so that common regulation with a common frequency is possible. However, a deviation in the regulation of an individual vibration head by only 0.1 Hz with a vibration frequency of 100 Hz causes a phase reversal of the individual vibration head after only 5 seconds. Even if the frequency is optimally regulated or controlled, small deviations in the amplitude occur when starting and stopping vibration. For the individual vibration heads, or respectively the overall system, that is not a problem per se. However, this requires a certain flexibility in the plastic component that in the final analysis must accommodate these deviations, which in turn leads to a worse welding result.

The technical problem therefore exists of providing an alternative construction of a vibration welding device by means of which elongated U-shaped or L-shaped components can be connected by means of vibration welding.

SUMMARY

The above problem may be solved by a vibration welding device, the use of a vibration welding device, a method for connecting at least two elongated components by means of a vibration welding device, and by a production method for a vibration welding device as set forth in the disclosure.

Further embodiments and further developments are set forth in in the following description, the accompanying drawings and the claims.

The vibration welding device with a mechanically coupled multiple vibrator has the following features: at least three vibration units, each consisting of at least one pair of electromagnetic coils that oppose each other, by means of which a spring-supported vibrator arranged therebetween can be made to execute linear vibrations in a first direction, an elongated tool by means of which a component to be welded is movable and that is mechanically connected to all vibration units, wherein the vibration units are arranged relative to the elongated tool such that the first direction of vibrations of the individual vibration units is oriented approximately transverse to a longitudinal axis of the tool such that, during a vibration welding process, two components are weldable to each other by vibrations different than a longitudinal direction of the components, in particular transverse to a longitudinal direction.

When vibration welding elongated components that may have a U-shape or an L-shape, it has proven to be advantageous when a plurality of known vibration units from the technical field of vibration welding, in this case at least three vibration units, are arranged with their vibration direction approximately perpendicular to a longitudinal direction of elongated components to be welded to each other. Due to their arrangement, the plurality of vibration units generate a relative transverse vibration of the components to be joined to each other with respect to their longitudinal axis. Since the at least three vibration units are mechanically coupled to each other by a common tool or a corresponding coupling element between the tool and the vibration units, the vibration properties of the vibration units such as amplitude and frequency can be preferably harmonized with each other. Correspondingly, this plurality of vibration units or vibration heads that are mechanically coupled to each other, preferably mechanically coupled twice (see below) form the mechanically coupled multiple vibrator. This construction ensures that uniform transverse vibrations of the at least three vibration units or vibration heads are transmitted by the tool to the components to be connected to each other such that they are reliably connected to each other despite the vibrations that do not run in a longitudinal direction. Moreover, it was revealed that the use of at least three vibration units enables a sufficient extension of the components to be connected to each other in their longitudinal direction so that for example wobbling of the moved part is sufficiently reduced.

According to a further embodiment, at least three vibration units are fastened spring-supported to a common bridge.

Also, the at least three vibration units or vibration heads (see below) may be evenly distributed over the longitudinal direction of the tool on the common bridge, or a component connecting the vibration heads. Due to this evenly distributed arrangement, the vibrations are uniformly transmitted by the tool approximately transverse to the longitudinal axis of the tool to approximately the entire longitudinal extension of the component connectable to the tool.

A known vibration unit for vibration consists of the aforementioned at least one pair of electromagnetic coils arranged opposite each other, as well as a spring-supported vibrator arranged therebetween. The vibrator is held by a spring package to a bridge that may bridge the electromagnetic coils. On the side of the vibrator facing away from the bridge, an upper tool is fastened to the vibrator directly or by a coupling element. To harmonize the vibrations between the at least three vibration units, it has proven to be advantageous to connect the individual vibration units to each other by only one common bridge. Analogous thereto (see below) a plurality of vibration heads are mechanically coupled to each other in order to function as just one vibration head. This common bridge that is otherwise provided individually in each vibration unit forms a simultaneous base for all vibration units and spring packages fastened thereto. In this case, the base profits from the mass of the individual bridges that add up to one overall vibration mass which would otherwise be provided in each individual vibration unit.

In addition to an intentional harmonization, stabilization and unification of the vibrations of the individual vibration units or vibration heads to form an overall vibration, the overall vibration may be specifically transmitted by the evenly distributed arrangement of the vibration units or vibration heads to the tool and the component. In so doing, the vibration units or vibration heads may be arranged evenly spaced laterally relative to each other in conjunction with the longitudinal extension of the tool. This arrangement ensures that the mechanically coupled vibration units or vibration heads transmit the transverse vibrations in the entire longitudinal region of the tool in order to support even vibration and reduce component wobbling.

According to another embodiment, one of the plurality of vibration units forms a master vibration unit, whereas the remaining vibration units each form a slave vibration unit with respect to the master vibration unit so that all vibration units can be operated in sync.

This type of harmonized control of a plurality of vibration units is known from EP 1 772 253 B1 to which specific reference is made with regard to the embodiment of such a master/slave control.

In addition to the above-described mechanical coupling and hence synchronization of the plurality of vibration units and/or vibration heads, they may be electronically coupled. A master/slave circuit may be used for this. The master/slave circuit correspondingly forms an additional security level for a harmonized operation of the plurality of vibration units and/or vibration heads. In this manner, a potential residual tendency of a workpiece to wobble during the welding process is reduced.

According to another embodiment, the vibration welding device may have at least three vibration heads that form the mechanically coupled multiple vibrator. These vibration heads each comprise at least one pair of electromagnetic coils arranged opposite each other with a vibrator arranged between these coils. The vibrator is always vibratingly fastened by a spring package to a bridge. This embodiment is furthermore distinguished in that the bridges of the plurality of vibration heads are mechanically connected to each other, and the vibration heads are moreover connected to each other by the elongated tool.

Analogous to the above-described combination of a plurality of vibration units, it may also be preferred to couple existing vibration heads to each other that are obtainable as a unit. Corresponding to the idea of the present disclosure, at least three vibration heads may be mechanically coupled to two sides. In this case, the one coupling side forms the mechanical connection for the individual bridges of these vibration heads. The other coupling side is formed by a tool connecting the vibration heads, or a coupling element arranged between the tool and vibration head.

A physical unit acting as just one vibration head arises from N vibration heads by jointly coupling the bridges to each other, and/or jointly coupling the vibration units to each other, be it by a common base plate to which the tool is screwed, or by the tool itself. This results in only one resonance frequency and one vibration direction. It then does not matter whether the weight of the tool is evenly distributed over the N vibration plates since the overall mass of the vibration units forms the new vibrating mass. Correspondingly, this mechanical connection of the plurality of vibration heads ensures that the plurality of vibration heads vibrates in phase, and moreover at the same amplitude.

It has been revealed that vibration heads vibrate all the better, i.e., with less expended energy and a reduced tendency to wobble when their mass-related dimensions are configured longer in the vibration direction than transverse to the vibration direction. According to another embodiment of the different design of the above-described vibration welding device, the plurality of vibration units or the plurality of vibration heads form a mechanical overall unit that forms an approximately rectangular contour with a side ratio of A/B≥1.0, wherein one forms a bottom threshold. In this context, it furthermore may be preferred to select the side ratio to be as large as possible in the context of the design and ergonomic options of the vibration device.

In this context, A and B describe the side lengths of the overall unit that substantially contribute to the mass of the overall unit. It is assumed that only the housing parts covering the device do not substantially contribute to the mass of the overall unit. Instead, coupled bridges, base plates, tools, vibration units, etc. substantially contribute to the overall mass. In this case, side A runs nearly parallel to the first direction of the vibrations of the vibration units or vibration heads, and side B runs nearly parallel to a longitudinal axis of the tool.

It was revealed that a size and arrangement of the overall unit according to the above dimensions mechanically supports the vibration behavior of the plurality of vibration units or vibration heads connected to each other. In particular, they cause the plurality of vibration units or vibration heads mechanically connected to each other to act as a single vibration head. In this context, the size of the side ratio of the overall unit is particularly relevant. The larger the side ratio, the more pronounced the tendency of the overall system to vibrate in the first direction, i.e., parallel to side A. The influence associated with the construction of the overall unit may ensure a harmonized vibration of the vibration units or vibration heads connected to each other with the same frequency, phase and amplitude.

According to another embodiment, the approximately rectangular contour of the connected vibration units or vibration heads with the joint vibration mass therefore has a side ratio of A/B≥2.0.

According to another embodiment of the present vibration welding device, the tool for accommodating the component has a length of at least 1 m, may be a length of ≥2 m. The tool length underscores the fact that the combination of the plurality of vibration heads or vibration units that vibrate in a transverse direction and are mechanically coupled with an elongated tool support stable vibration welding in a direction transverse to the tool, or respectively component length.

The present disclosure also comprises the use of a vibration welding device according to one of the above-described embodiments for welding at least two elongated components that have a side ratio of a long side to a short side greater than one, wherein the welding vibrations are oriented almost parallel to the shorter side of the components to be connected to each other.

Moreover, the present disclosure comprises a method for connecting the at least two elongated components by means of vibration welding, in particular with a vibration welding device according to one of the above-described embodiments. The vibration welding method has the following steps: Clamp an elongated component in a tool that is mechanically connected to at least three vibration units that are mechanically coupled to each other, or at least three vibration heads that are mechanically connected to each other, of a vibration welding device, generate vibrations of the component by the tool connected to the vibration units or the vibration heads such that a first direction of the vibrations is oriented different than a longitudinal axis of the component, may transverse to the longitudinal axis of the component, and connect the at least two components by pressing the first vibrating component and the second component against each other.

In this context, it has proven advantageous to transmit the vibrations of the plurality of vibration units or vibration heads coupled to each other to the elongated component such that despite its length it generates a reliable transverse vibration oriented transverse to its longitudinal axis for connecting to another component. This is generated specifically so that the plurality of vibration units or the plurality of vibration heads are mechanically coupled to each other. A first coupling may be effectuated by the tool or a coupling element used therewith that establishes a simultaneous connection to each of the vibration units or vibration heads in addition to the tool. In combination therewith, it also may be preferable to connect the vibration units or vibration heads to each other by their bridges. Correspondingly, an arrangement functioning as a vibration head results that covers a sufficient longitudinal section of the elongated component in order to transmit transverse vibrations thereby to connect to another component. Moreover, it follows from the above description that the vibration units or the vibration heads may be mechanically coupled to each other twice, i.e., tool-side and bridge-side.

The coils generating the vibrations may be charged by a power supply, and the coupled vibration units function as a single vibration unit.

In addition to mechanically coupling the plurality of vibration units, the vibration welding method has the additional steps: Control at least one vibration unit as a master vibration unit, or control at least one vibration head as a master vibration head, and control the remaining vibration units as a slave vibration unit, or the remaining vibration heads as a slave vibration head with respect to the master vibration unit or the master vibration head. Based on this procedure, an electronic coupling may be preferred (see above) in addition to mechanically harmonizing the vibration units and/or vibration heads by physically coupling. Electronic coupling by a master/slave control may form an additional support for synchronized operation of the plurality of vibration units and/or vibration heads.

The present disclosure moreover comprises a production method for a vibration welding device that has the following steps: Provide at least three vibration units or vibration heads that each consist of at least one pair of electromagnetic coils facing each other with a spring-supported vibrator arranged therebetween, connect the at least three vibration units or vibration heads by an elongated tool by means of which a component to be welded can be moved, wherein the elongated tool is arranged relative to the at least three vibration units such that a first direction of the vibrations of the vibration units or vibration heads is oriented different than a longitudinal axis of the elongated tool.

In the context of this production method, it may moreover be preferred to fasten the at least three vibration units in a parallel arrangement on a common bridge. According to another embodiment, it may be preferred to mechanically couple the at least three vibration heads in a parallel arrangement to each other by their bridges. This has the effect already described above that the plurality of vibration units or vibration heads combined with each other functions as a single vibration head.

According to another embodiment, the production method may comprise the additional step: Connect the vibration units or vibration heads to form a mechanical overall unit that defines an approximately rectangular contour with a side ratio that may be A/B≥1.0, in that A is arranged parallel to a first direction of the vibrations of the vibration units or vibration heads, and B is arranged parallel to a longitudinal axis of the tool.

BRIEF DESCRIPTION OF THE DRAWINGS

Some embodiments of the present disclosure are explained in greater detail with reference to the accompanying drawings. In the following.

DETAILED DESCRIPTION

Figure 1:
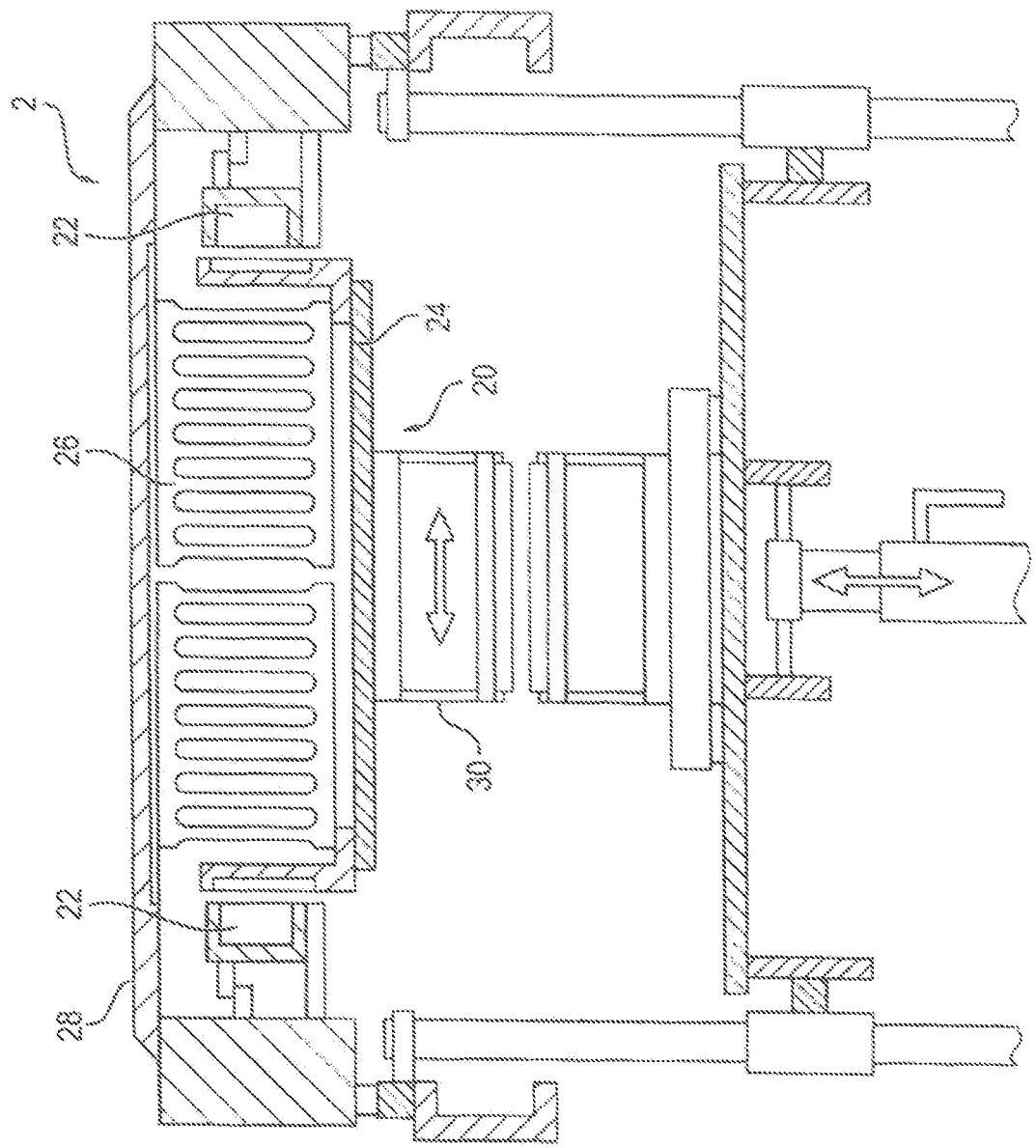
FIG. 1 shows a schematic representation of an embodiment of a vibration head.

FIG. 1 shows a known vibration head 2 with a vibration unit 20. The vibration unit 20 comprises a pair of electromagnetic coils 22 arranged opposite each other. At this point, the use of a plurality of pairs of electromagnetic coils 22 arranged opposite each other may also be preferred. When charged alternatingly, the coils 22 cause a vibrator 24 arranged between them to vibrate linearly. To support the vibration of the vibrator 24, it is fastened by a spring package 26 to a bridge 28. The vibrator 24 is connected to a tool 30. The tool 30 serves to receive a component in order to transfer the vibrations of the vibrator 24 to the component. If the vibrating component is pressed against another component, the friction heat generated by the vibrations causes the two components to be connected. Corresponding to the arrangement of the coils 22, the vibrator 24 and hence the tool 30 as well vibrates in the longitudinal direction of the vibrator 24 (see double arrow in FIG. 1).

Figure 2A:
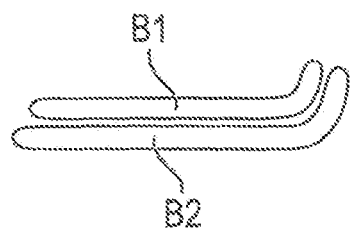
FIG. 2A shows a schematic representation of two L-shaped components arranged on top of each other that are to be welded to each other.
Figure 2B:
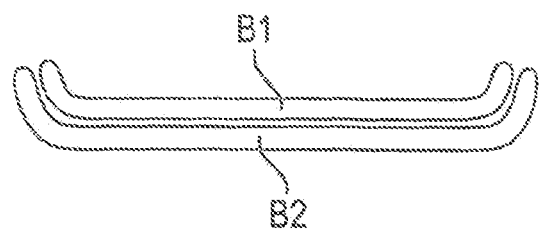
FIG. 2B shows a schematic representation of two U-shaped components to be welded to each other.
Figure 2B:
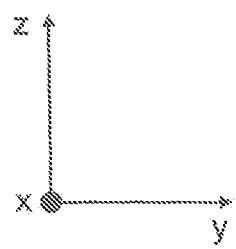

Usually, components B1, B2 are made to vibrate in the longitudinal direction, i.e., in a Y-direction in order to connect them by vibration welding. With the L-shaped and U-shaped components B1, B2 in FIGS. 2A and 2B, this would cause the components to be damaged. In order to prevent damage, the components B1, B2 may be made to vibrate in the X direction, i.e., may be transverse to the longitudinal axis of the components B1, B2.

In order to reliably weld an elongated component B1, B2 running in the Y direction with a U-shape or L-shape, it is made to vibrate transverse to its longitudinal direction, i.e., in the X direction. To this end, at least three vibration units 20 or at least three vibration heads 2 are mechanically coupled to each other in order to vibrate almost uniformly. Vibration unit 20 in this context designates the combination consisting of coils 22, vibrator 24, spring package 26 and bridge 28.

Figure 3:
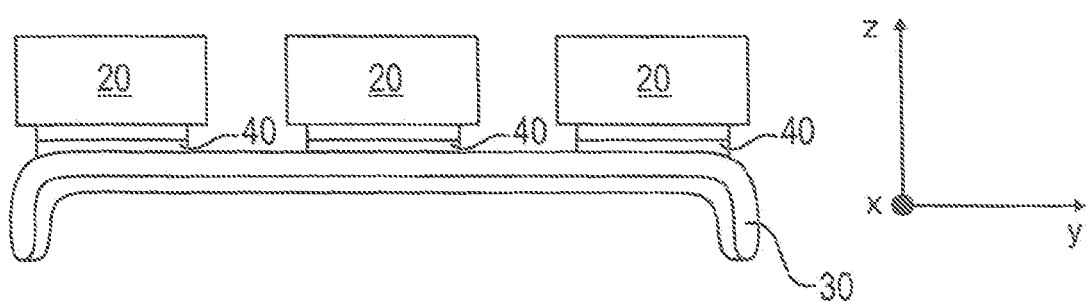
FIG. 3 shows an embodiment of a vibration welding device with three vibration units that are mechanically connected to each other by a common tool.

The vibration direction of the at least three vibration units 20 is arranged parallel to the X-direction, and hence transverse to the longitudinal direction of the components B1, B2. Moreover, the vibration units 20 are arranged parallel to each other as can be seen in FIG. 3.

The at least three vibration units 20 are evenly distributed in the longitudinal direction of the components B1, B2 in order to transmit the vibration as uniformly as possible to the entire component length, or to a greater part of the component length. It therefore may also be preferred to use more than three vibration units 20 in a parallel arrangement, such as four, five or six vibration units 20 or vibration heads 2.

The vibration units 20 may be all connected directly or indirectly by a common coupling element 40 to the same tool 30. These may support the operation of the plurality of vibration units 20 with approximately the same frequency and amplitude. Reliable vibration results may be achieved in this manner.

Given the mechanical coupling of the plurality of vibration units 20 by the common tool 30, the vibration welding device functions like a single vibration head.

According to another embodiment, the joint operation of the at least three vibration heads 20 is additionally improved in that the vibration units 20 are fastened to a common bridge 28'. Correspondingly, the common bridge 28' supports and holds the plurality of spring packages 26, the coil pairs 22 and the vibrator 24 of the plurality of vibration units 20. This is schematically portrayed in FIG. 4. Accordingly, the at least three vibration units 20 are mechanically coupled to each other twice, i.e., by the continuously-extending tool 30 and the common bridge 28'.

Figure 4:
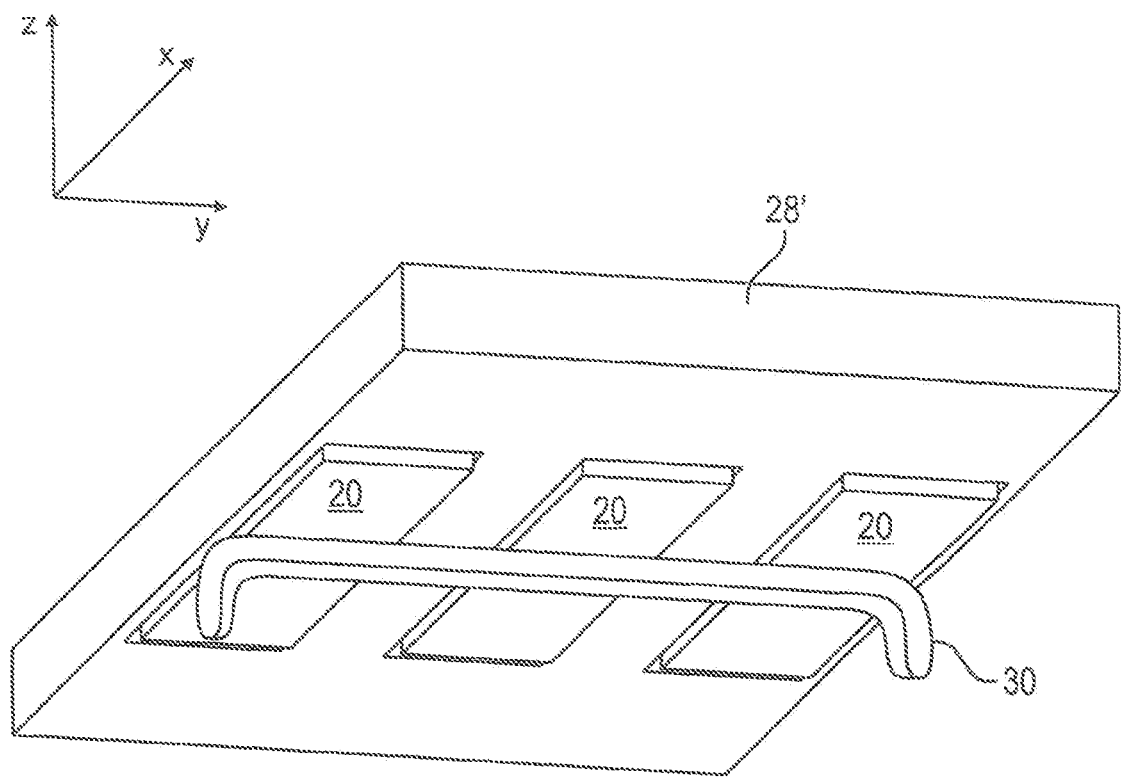
FIG. 4 shows a schematic representation of the vibration device according to FIG. 5 in a perspective representation with a tool for a U-shaped component.
Figure 5:
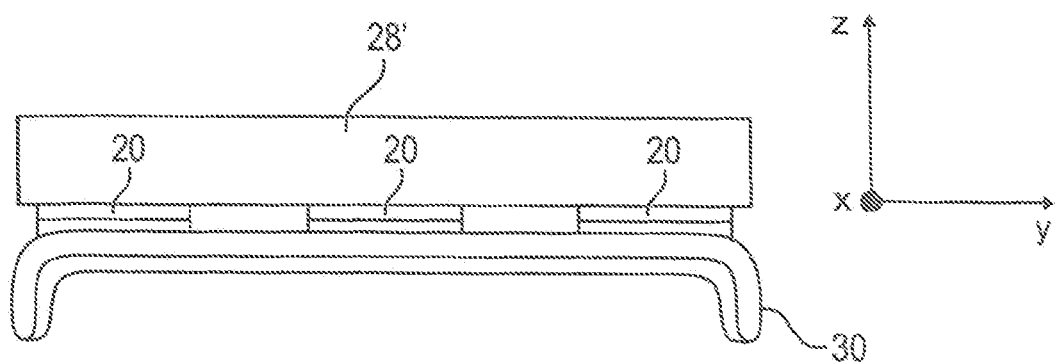
FIG. 5 shows a schematic representation of an embodiment of a vibration welding device with three vibration units that are connected to each other physically by a common tool and a common bridge.

For reasons of simplified representation, the coupling element 40 is not shown in the schematic drawings in FIGS. 4 and 5. Nonetheless, the coupling element 40 may be used to connect the vibration unit 20 and tool 30.

Figure 6:
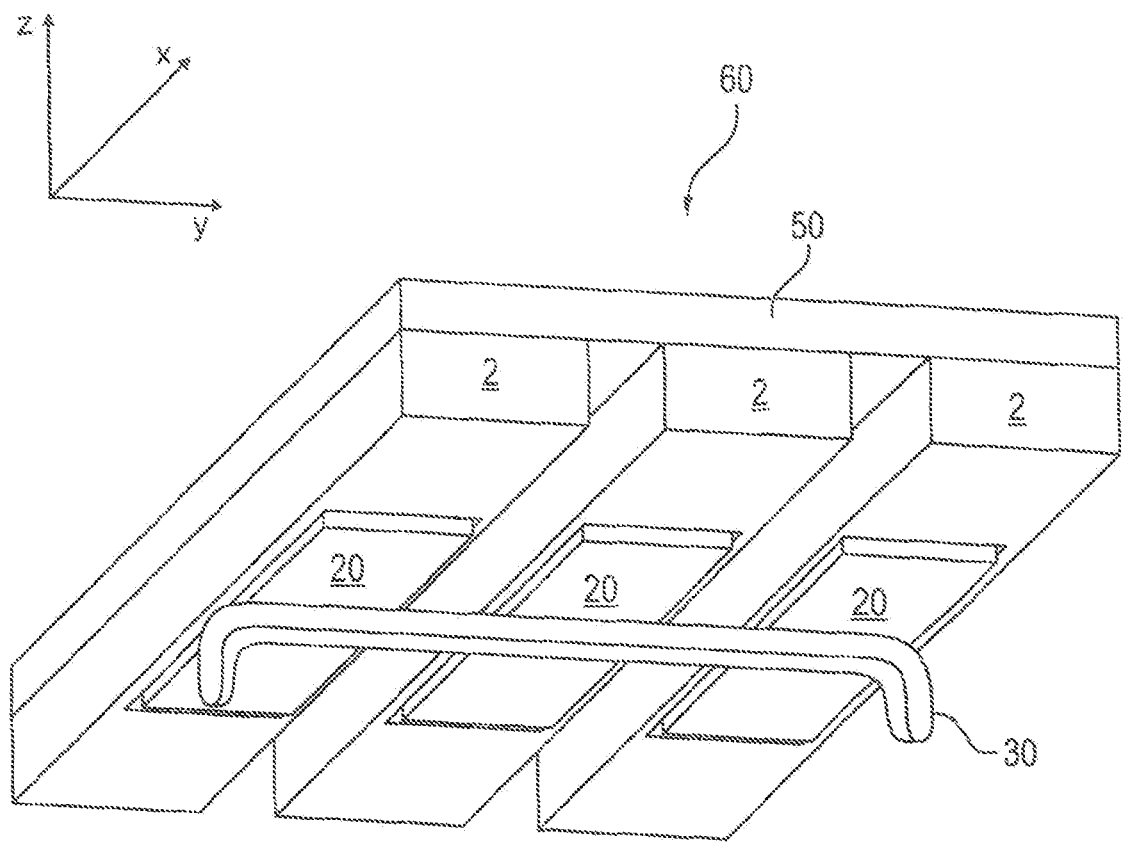
FIG. 6 shows a perspective representation of an embodiment of the vibration welding device according to FIG. 7.
Figure 7:
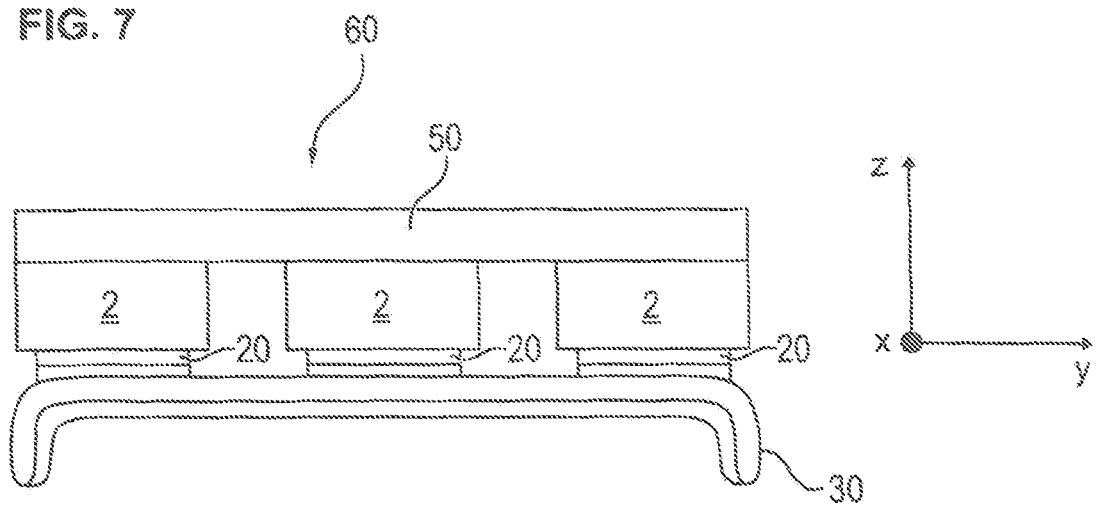
FIG. 7 shows a schematic side view of an embodiment of the vibration welding device consisting of three vibration heads that are connected to each other by a common tool and a common bridge.
Figure 8:
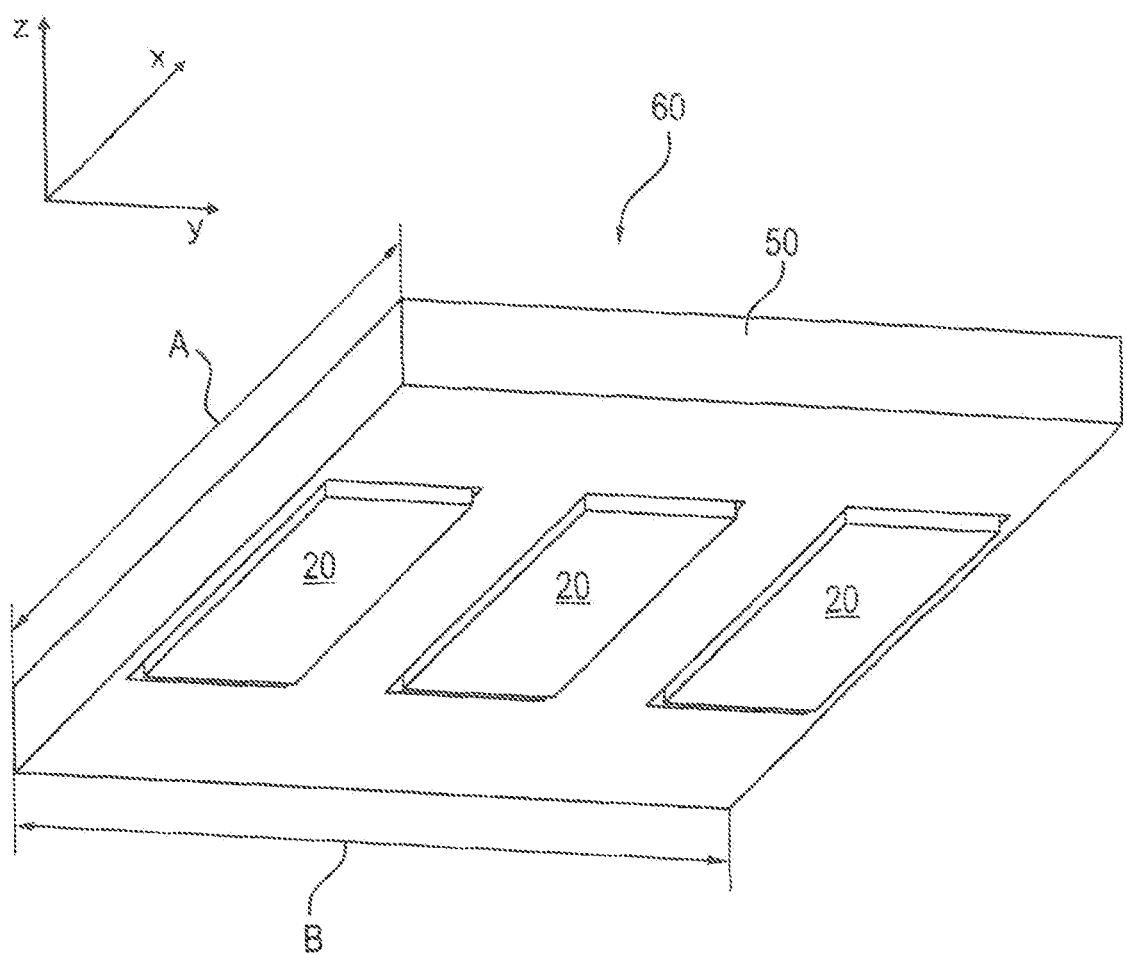
FIG. 8 shows a perspective view of an embodiment from FIG. 4, in this case portrayed without a tool.

FIGS. 6 and 7 show another embodiment of the present invention. Instead of the above-described vibration unit 20, at least three vibration heads 2 are mechanically coupled to each other in a parallel arrangement. According to a further embodiment, the mechanical coupling is by the continuous tool 30. For this, the tool 30 is connected to each setting head 2 by a coupling element 40 (not shown).

As can be seen with reference to FIG. 6, each vibration head 2 contains a vibration unit 20 as a subcomponent as known from the prior art according to FIG. 1.

To support the joint operation of the vibration heads 2, they may be connected to each other mechanically by a connecting element 50. The connecting element 50 thereby satisfies the same function as the above-described common bridge 28'.

In the same manner as in the arrangement in FIG. 4, the mechanical couplings by the tool 30 and the common bridge 28' or the connecting element 50 function supportively for the vibration-welding vibration behavior in the X-direction, i.e., transverse to the longitudinal axis of the tool 30 or the components 1, 2. A mechanical overall unit 60 results from the dual mechanical coupling of the vibration units 20 or the setting heads 2 by the tool 30 and the common bridge 28' or the connecting element 50. This overall unit 60 may have an approximately rectangular contour with sides A and B. The side B runs parallel to the Y-direction or to the longitudinal axis of the tool 30 and component B1, B2. The side A is oriented in the vibration direction of the vibration welding device, i.e., in the X-direction.

In order to mechanically support vibration behavior in the X-direction, it may be preferable to adjust the length of the side A to be greater or at least the same size as the length of the side B of the overall unit 60. The larger the side ratio of side A to side B, the more pronounced the mechanical tendency of the overall system 60 to vibrate in a stable manner in the X-direction. In most cases, a harmonized vibration at the same frequency, phase and amplitude results during vibration welding for this reason alone with a correspondingly appropriate selection of the geometry of the overall unit 60.

It therefore may be preferable for the side ratio A/B of the overall unit 60 to lie within a range of $A/B \geq 1.0$.

According to another embodiment that for example is directed toward the connection and production of elongated lights, dashboards, and panels for furniture and/or packaging designs, the side ratio A/B of the overall unit 60 may lie within a preferred range of $A/B \geq 2.0$.

It moreover may be preferable to connect the coupled vibration units or vibration heads (see below) with a tool having a length of at least 1 m, preferably a length of $\geq 2$ m. The tool length ensures that the transverse vibrations of the combination of the plurality of vibration units or vibration heads that vibrate in a transverse direction and are mechanically coupled are uniformly transferable to the entire length of the component. To this end, it is advantageous to arrange the plurality of vibration units or vibration heads distributed evenly over the length of the tool.

According to another embodiment, one of the plurality of vibration units 20 or one of the plurality of vibration heads 2 is operated as a master as described in EP 1 772 253 B1. Correspondingly, the at least two other vibration units or vibration heads 2 are controlled as a slave. With regard to the specific master/slave control, reference is made to EP 1 772 253 B1 which is hereby incorporated by means of reference. Also, given the addressed master/slave control, an inharmonious vibration may be harmonized which may prevent the tool or the components to be connected to each other from wobbling. In this context, it is noted that the vibration unit 20 arranged in the middle or the vibration head 2 arranged in the middle may be used as a master vibration unit, or respectively master vibration head.

The above-described embodiments of the vibration welding device may be used for vibration welding elongated components. These may be lights, bumpers, and dashboards or uses from other fields than the automotive sector. These elongated components are distinguished by a side ratio of the long component side to the short component side of greater than one. Corresponding to the above description, the vibrations for vibration welding these components run parallel to the short side of the elongated components.

Figure 9:
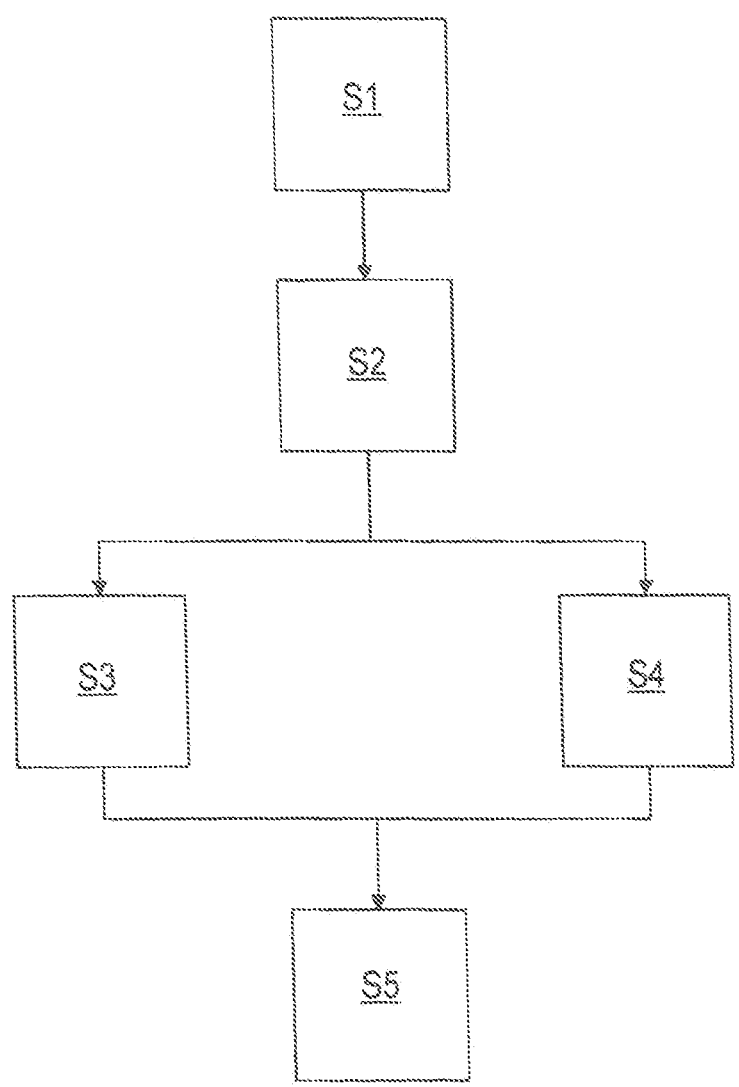
FIG. 9 shows a flowchart of an embodiment of the production method.

The vibration method for at least two elongated components by vibration welding is summarized in the flowchart in FIG. 9. In a first step S1, the elongated component B1 is clamped in the tool 30. According to the above-described embodiments of the vibration welding device, the tool is mechanically connected to at least three vibration units 20, or at least three vibration heads 2 of the vibration welding device.

Subsequently in step S2, the components to be connected to each other undergo relative vibrations from the tool 3 connected to the vibration units 20 or to the vibration heads 2. These relative vibrations are oriented different than the longitudinal axis of the component, and may be transverse to the longitudinal axis of the components.

According to a further embodiment of the present connecting method, at least one vibration unit, or at least one vibration head 2 is controlled in step S3 as a master vibration unit or as a master vibration head. Moreover, the remaining vibration units 20 are controlled as slave vibration units, or the remaining vibration heads 2 are controlled as slave vibration heads with respect to the master vibration unit or the master vibration head in preferred step S4. In step S5, the at least two components are then connected by bringing the first vibrating component into contact with the second vibrating component B2.

Figure 10:
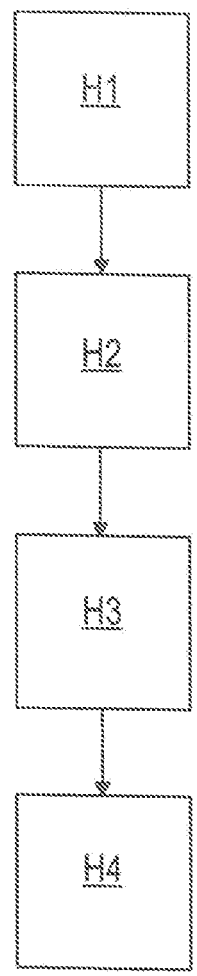
FIG. 10 shows a flowchart of an embodiment of a production method.

Moreover, the present disclosure comprises a production method for a vibration welding device that is described with reference to the flowchart in FIG. 10. This production method has the following steps: firstly in step H1, at least three vibration units 20 or vibration heads 2 with the above-described constructive design are provided. Subsequently, the at least three vibration units 20 or the vibration heads 2 are then connected to each other by the elongated tool 30 in step H2. In so doing, the tool 30 is connected to the vibration units 20 or the vibration heads 2 such that a first direction of the vibrations of the vibration units 20 or the vibration heads 2 is aligned different than a longitudinal axis of the elongated tool 30.

In the next step H3, the at least three vibration units 20 or vibration heads 2 are fastened in a parallel arrangement to a common bridge 28' or the above-described connecting element 50. A mechanical overall unit 60 of the vibration welding device results due to the mechanical couplings of the at least three vibration units 20 or the at least three vibration heads 2 by the tool 30 and the common bridge 28' or the connecting element 50. This mechanical overall unit 60 may have an approximately rectangular contour with a side ratio of preferably $A/B \geq 1.0$, and more preferably $A/B \geq 2$. The side surfaces A, B of the overall unit 60 are oriented according to the above description. To support a harmonious vibration behavior of the overall unit 60, it accordingly may be preferred to connect to each other the vibration units 20 or the vibration heads 2 corresponding to the design of such an overall unit 60 (step H4).

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A vibration welding device with a mechanically coupled multiple vibrator, wherein the vibration welding device comprises:

a. at least three vibration units, each consisting of at least one pair of electromagnetic coils that oppose each other, wherein by each of the at least one pair of electromagnetic coils a spring-supported vibrator arranged therebetween can be made to execute linear vibrations in a first direction, b. an elongated tool, wherein by the elongated tool a component to be welded is movable and the elongated tool is mechanically connected to all vibration units, wherein c. the vibration units are arranged relative to the elongated tool such that the first direction of vibrations of the individual vibration units is oriented approximately transverse to a longitudinal axis of the tool such that, during a vibration welding process, two components are weldable to each other by vibrations in a direction different than a longitudinal direction of the components.

2. The vibration welding device according to claim 1, wherein the at least three vibration units are fastened in a spring-supported manner to a common bridge.

3. The vibration welding device according to claim 2, wherein one of the vibration units forms a master vibration unit, whereas the remaining vibration units each form a slave vibration unit with respect to the master vibration unit so that all vibration units can be operated in sync.

4. The vibration welding device according to claim 3, wherein the vibration units mechanically coupled to each other form a mechanical overall unit with a joint vibration mass that defines an approximately rectangular contour with a side ratio of A/B≥1.0, in which A is arranged parallel to the first direction of the vibrations of the vibration units, and B is arranged parallel to a longitudinal axis of the tool.

5. The vibration welding device according to claim 4, wherein the side ratio of A/B≥2.

6. The vibration welding device according to claim 2, wherein the vibration units mechanically coupled to each other form a mechanical overall unit with a joint vibration mass that defines an approximately rectangular contour with a side ratio of A/B≥1.0, in which A is arranged parallel to the first direction of the vibrations of the vibration units, and B is arranged parallel to a longitudinal axis of the tool.

7. The vibration welding device according to claim 6, comprising the side ratio of A/B≥2.

8. The vibration welding device according to claim 1, wherein one of the vibration units forms a master vibration unit, whereas the remaining vibration units each form a slave vibration unit with respect to the master vibration unit so that all vibration units can be operated in sync.

9. The vibration welding device according to claim 1, wherein the mechanically coupled multiple vibrator has at least three vibration heads that each comprise the pair of electromagnetic coils arranged opposite each other with the spring-supported vibrator arranged between these coils, the spring-supported vibrator of which is vibratingly attached in each case via a spring package to a bridge, wherein
    a. the bridges of the at least three vibration heads are mechanically connected to each other, and
    b. the at least three vibration heads are connected to each other by the elongated tool.

10. The vibration welding device according to claim 9, wherein the vibration heads mechanically coupled to each other form a mechanical overall unit with a joint vibration mass that defines an approximately rectangular contour with a side ratio of A/B≥1.0, in which A is arranged parallel to the first direction of the vibrations of the vibration units, and B is arranged parallel to a longitudinal axis of the tool.

11. The vibration welding device according to claim 10, wherein the side ratio of A/B≥2.

12. The vibration welding device according to claim 1, wherein the vibration units mechanically coupled to each other form a mechanical overall unit with a joint vibration mass that defines an approximately rectangular contour with a side ratio of A/B≥1.0, in which A is arranged parallel to the first direction of the vibrations of the vibration units, and B is arranged parallel to a longitudinal axis of the tool.

13. The vibration welding device according to claim 12, comprising the side ratio of A/B≥2.

14. The vibration welding device according to claim 1, wherein the vibration units are arranged relative to the elongated tool such that the first direction of vibrations of the individual vibration units is oriented approximately transverse to a longitudinal axis of the tool such that, during a vibration welding process, two components are weldable to each other by vibrations transverse to a longitudinal direction of the components.

15. A use of a vibration welding device according to claim 1 for welding at least two elongated components that have a side ratio of a long side to a short side greater than one, wherein the welding vibrations are oriented almost parallel to the shorter side of the components.

16. A method for connecting at least two elongated components by vibration welding with a vibration welding device, wherein the vibration welding device comprises at least three vibration units, each consisting of at least one pair of electromagnetic coils that oppose each other, wherein by each of the at least one pair of electromagnetic coils a spring-supported vibrator arranged therebetween can be made to execute linear vibrations in a first direction, an elongated tool, wherein by the elongated tool a component to be welded is movable and the elongated tool is mechanically connected to all vibration units, wherein the vibration units are arranged relative to the elongated tool such that the first detection of vibrations of the individual vibration units is oriented approximately transverse to a longitudinal axis of the tool such that, during a vibration welding process, two components are weldable to each other by vibrations in a direction different than a longitudinal direction of the components, wherein the method comprises the following steps:
    a. clamping an elongated component in the elongated tool that is mechanically connected to the at least three vibration units that are mechanically coupled to each other,
    b. generating vibrations of the component by the elongated tool connected to the at least three vibration units such that a first direction of the vibrations is oriented different than a longitudinal axis of the component,
    c. connecting the at least two components by pressing the first vibrating component and the second component against each other.

17. The method according to claim 16, which has the further step:
    controlling at least one vibration unit as a master vibration unit, and
    controlling all the remaining vibration units as slave vibration unit with respect to the master vibration unit.

18. A production method for a vibration welding device, wherein the vibration welding device comprises at least three vibration units, each consisting of at least one pair of electromagnetic coils that oppose each other, wherein by each of the at least one pair of electromagnetic coils a spring-supported vibrator arranged therebetween can be made to execute linear vibrations in a first direction, an elongated tool, wherein by the elongated tool a component to be welded is movable and the elongated tool is mechanically connected to all vibration units, wherein the vibration units are arranged relative to the elongated tool such that the first direction of vibrations of the individual vibration units is oriented approximately transverse to a longitudinal axis of the tool such that, during a vibration welding process, two components are weldable to each other by vibrations in a direction different than a longitudinal of the components, wherein the production method comprises the following steps:
   a. providing the at least three vibration units that each consist of one pair of electromagnetic coils facing each other with the spring-supported vibrator arranged therebetween,
   b. connecting the at least three vibration units by the elongated tool by which a component to be welded can be moved, wherein the elongated tool is arranged relative to the at least three vibration units such that a first direction of the vibrations of the vibration units is oriented different than a longitudinal axis of the elongated tool.

19. The production method according to claim 18, which has the further step:

fastening the at least three vibration units in a parallel arrangement to a common bridge or a connecting element.

20. The production method according to claim 19, that comprises the additional step:

providing the vibration units mechanically coupled to each other as a mechanical overall unit that defines an approximately rectangular contour with a side ratio of A/B≥1.0, in which A is arranged parallel to the first direction of the vibrations of the vibration units, and B is arranged parallel to a longitudinal axis of the elongated tool.

21. The production method according to claim 18, that comprises the additional step:

providing the vibration units mechanically coupled to each other as a mechanical overall unit that defines an approximately rectangular contour with a side ratio of A/B≥1.0, in which A is arranged parallel to the first direction of the vibrations of the vibration units, and B is arranged parallel to a longitudinal axis of the elongated tool.

* * * * *